US012462967B2

(12) United States Patent
Masuda

(10) Patent No.: US 12,462,967 B2
(45) Date of Patent: Nov. 4, 2025

(54) TRANSFORMER

(71) Applicants: AutoNetworks Technologies, Ltd., Yokkaichi (JP); Sumitomo Wiring Systems, Ltd., Yokkaichi (JP); Sumitomo Electric Industries, Ltd., Osaka (JP)

(72) Inventor: Kazuki Masuda, Yokkaichi (JP)

(73) Assignees: AutoNetworks Technologies, Ltd., Yokkaichi (JP); Sumitomo Wiring Systems, Ltd., Yokkaichi (JP); Sumitomo Electric Industries, Ltd., Osaka (JP)

( * ) Notice: Subject to any disclaimer, the term of this patent is extended or adjusted under 35 U.S.C. 154(b) by 981 days.

(21) Appl. No.: 17/612,743

(22) PCT Filed: May 7, 2020

(86) PCT No.: PCT/JP2020/018499
§ 371 (c)(1),
(2) Date: Nov. 19, 2021

(87) PCT Pub. No.: WO2020/241190
PCT Pub. Date: Dec. 3, 2020

(65) Prior Publication Data

US 2022/0238271 A1 Jul. 28, 2022

(30) Foreign Application Priority Data

May 28, 2019 (JP) ................................ 2019-099186

(51) Int. Cl.
*H01F 5/00* (2006.01)
*H01F 27/24* (2006.01)
(Continued)

(52) U.S. Cl.
CPC ......... *H01F 27/2804* (2013.01); *H01F 27/24* (2013.01); *H01F 30/10* (2013.01); *H01F 2027/2809* (2013.01)

(58) Field of Classification Search
CPC .................................................. H01F 27/2804
(Continued)

(56) References Cited

U.S. PATENT DOCUMENTS 5,184,103 A * 2/1993 Gadreau ............ H01F 27/2804 336/200
6,833,781 B1 12/2004 Padmanabhan et al.
(Continued)

FOREIGN PATENT DOCUMENTS

JP 2008-270347 A 11/2008
JP 2014-179402 A 9/2014
JP 2015-192082 A 11/2015

OTHER PUBLICATIONS

International Search Report, Application No. PCT/JP2020/018499, mailed Jul. 14, 2020. ISA/Japan Patent Office.

*Primary Examiner* — Ronald Hinson
(74) *Attorney, Agent, or Firm* — Honigman LLP

(57) ABSTRACT

A first coil includes a first end and a second end. A second coil includes a third end and a fourth end. A secondary winding includes a first conductor and a second conductor. The first conductor is sandwiched between the first end and the third end in a first direction and is conductively connected to the first end and the third end. The second conductor is sandwiched between the second end and the fourth end in the first direction and is conductively connected to the second end and the fourth end. The first end and the second end are arranged in a second direction orthogonal to the first direction. The third end and the fourth end are arranged in the second direction. The first conductor
(Continued)

and the second conductor are arranged in the second direction.

4 Claims, 10 Drawing Sheets

(51) Int. Cl.
*H01F 27/28* (2006.01)
*H01F 30/10* (2006.01)

(58) Field of Classification Search
USPC .......................................... 336/200, 221, 232
See application file for complete search history.

(56) References Cited

U.S. PATENT DOCUMENTS

2002/0149461 A1* 10/2002 Patel .................. H01F 27/2804 336/200
2016/0217905 A1 7/2016 Yang et al.
2018/0174737 A1* 6/2018 Song ....................... H01F 27/24

* cited by examiner

TRANSFORMER

CROSS-REFERENCE TO RELATED APPLICATIONS

This application is the U.S. national stage of PCT/JP2020/018499 filed on May 7, 2020, which claims priority of Japanese Patent Application No. JP 2019-099186 filed on May 28, 2019, the contents of which are incorporated herein.

TECHNICAL FIELD

The present disclosure relates to a transformer.

BACKGROUND

There is a known transformer in which a primary coil and a secondary coil included therein are both stacked. For example, JP 2015-192082A discloses a thin transformer in which a primary coil and a secondary coil are disposed in the same plane. In this thin transformer, a plurality of planar coils are arranged one on top of one another.

However, with the configuration described in JP 2015-192082A, the primary coil and the secondary coil are provided in the same plane, and therefore the same plane in which these coils are disposed requires a wide area. On the other hand, simply stacking the primary coil and the secondary coil is likely to result in a significant leakage flux in their respective end portions. When a leakage flux is increased, the leakage inductance is increased.

Therefore, it is an object of the present disclosure to provide a transformer including stacked primary and secondary coils with a reduced leakage inductance, in which the leakage inductance is reduced.

SUMMARY

A transformer according to the present disclosure includes a primary winding and a secondary winding that are insulated from each other, the secondary winding including a first coil and a second coil that are conductively connected to each other, the primary winding including a third coil, and all of the first coil, the second coil, and the third coil at least partially encircling one axis extending along a first direction.

The first coil, the second coil, and the third coil are stacked in the first direction. The first coil includes a first end and a second end. The second coil includes a third end and a fourth end. The secondary winding further includes a first conductor and a second conductor.

The first conductor is sandwiched between the first end and the third end in the first direction so as to be conductively connected to the first end and the third end. The second conductor is sandwiched between the second end and the fourth end in the first direction so as to be conductively connected to the second end and the fourth end. A second direction is orthogonal to the first direction.

The first end and the second end are arranged adjacent to, but not in contact with, each other in the second direction. The third end and the fourth end are arranged adjacent to, but not in contact with, each other in the second direction. The first conductor and the second conductor are arranged adjacent to, but not in contact with, each other in the second direction.

A first position is different from at least one of a second position and a third position. The first position is a position in the second direction of a boundary between the first conductor and the second conductor. The second position is a position in the second direction of a boundary between the first end and the second end. The third position is a position in the second direction of a boundary between the third end and the fourth end.

ADVANTAGEOUS EFFECTS OF INVENTION

The transformer according to the present disclosure includes stacked primary and secondary coils, in which the leakage inductance is reduced.

DETAILED DESCRIPTION OF PREFERRED EMBODIMENTS

Figure 1:
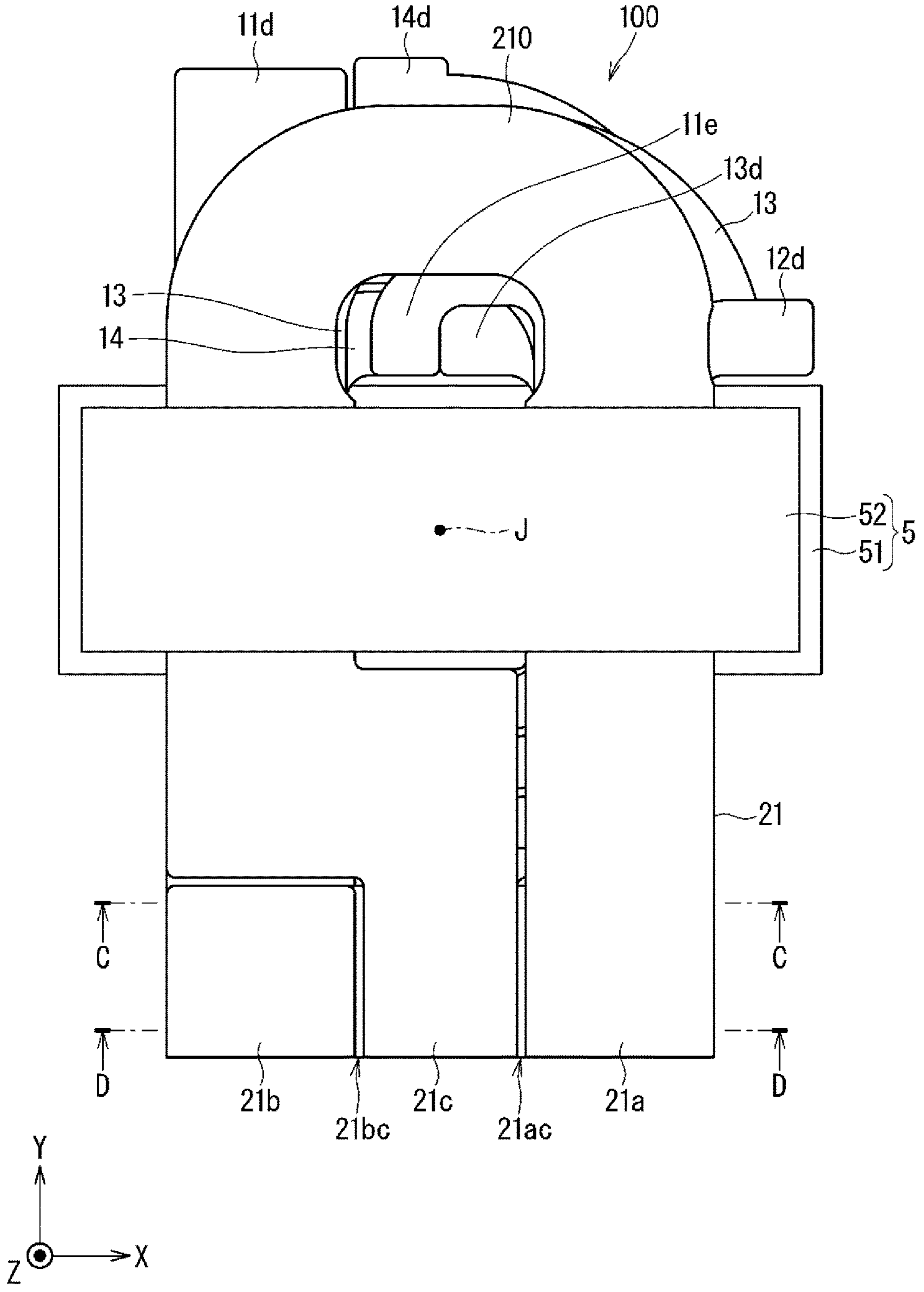
FIG. 1 is a plan view illustratively depicting the configuration of a transformer according to Embodiment 1.

First, aspects of the present disclosure will be listed and described.

The present disclosure is as follows.

A transformer includes a primary winding and a secondary winding that are insulated from each other, the secondary winding including a first coil and a second coil that are conductively connected to each other, the primary winding including a third coil. All of the first coil, the second coil, and the third coil at least partially encircle one axis extending along a first direction.

The first coil, the second coil, and the third coil are stacked in the first direction. The first coil includes a first end and a second end. The second coil includes a third end and a fourth end. The secondary winding further includes a first conductor and a second conductor.

The first conductor is sandwiched between the first end and the third end in the first direction so as to be conductively connected to the first end and the third end. The second conductor is sandwiched between the second end and the fourth end in the first direction so as to be conductively connected to the second end and the fourth end. A second direction is orthogonal to the first direction.

The first end and the second end are arranged adjacent to, but not in contact with, each other in the second direction. The third end and the fourth end are arranged adjacent to, but not in contact with, each other in the second direction. The first conductor and the second conductor are arranged adjacent to, but not in contact with, each other in the second direction.

A first position is different from at least one of a second position and a third position. The first position is a position in the second direction of a boundary between the first conductor and the second conductor. The second position is a position in the second direction of a boundary between the first end and the second end. The third position is a position in the second direction of a boundary between the third end and the fourth end.

Due to the first position being different from at least one of the second position and the third position, the action of increasing the magnetic resistance to the leakage flux occurs, resulting in a reduction in the leakage flux, and hence the leakage inductance.

It is preferable that the secondary winding further includes a third conductor, the first coil further includes a fifth end, the second coil further includes a sixth end, the fifth end and the second end are arranged adjacent to, but not in contact with, each other in the second direction, the sixth end and the fourth end are arranged adjacent to, but not in contact with, each other in the second direction, the third conductor is sandwiched between the fifth end and the sixth end in the first direction so as to be conductively connected to the fifth end and the sixth end, the third conductor and the second conductor are arranged adjacent to, but not in contact with, each other in the second direction, a fourth position is different from at least one of the first position and the second position, and the fourth position is a position in the second direction of a boundary between the third conductor and the second conductor. The reason being that the fifth end and the sixth end are center taps of the secondary winding.

It is preferable that the third coil is sandwiched between the first coil and the second coil in the first direction, and the third coil, the first conductor, and the second conductor are located aligned in the first direction. The reason being that this reduces the leakage flux.

Specific examples of the transformer according to the present disclosure will be described below with reference to the drawings. It should be noted that the present disclosure is not limited to these examples, but is defined by the claims, and is intended to include all modifications which fall within the scope of the claims and the meaning and scope of equivalents thereof.

Embodiment 1

In the following, a transformer according to Embodiment 1 will be described. FIG. 1 is a plan view illustratively depicting the configuration of a transformer 100 according to Embodiment 1. The transformer 100 includes a core 5.

Figure 2:
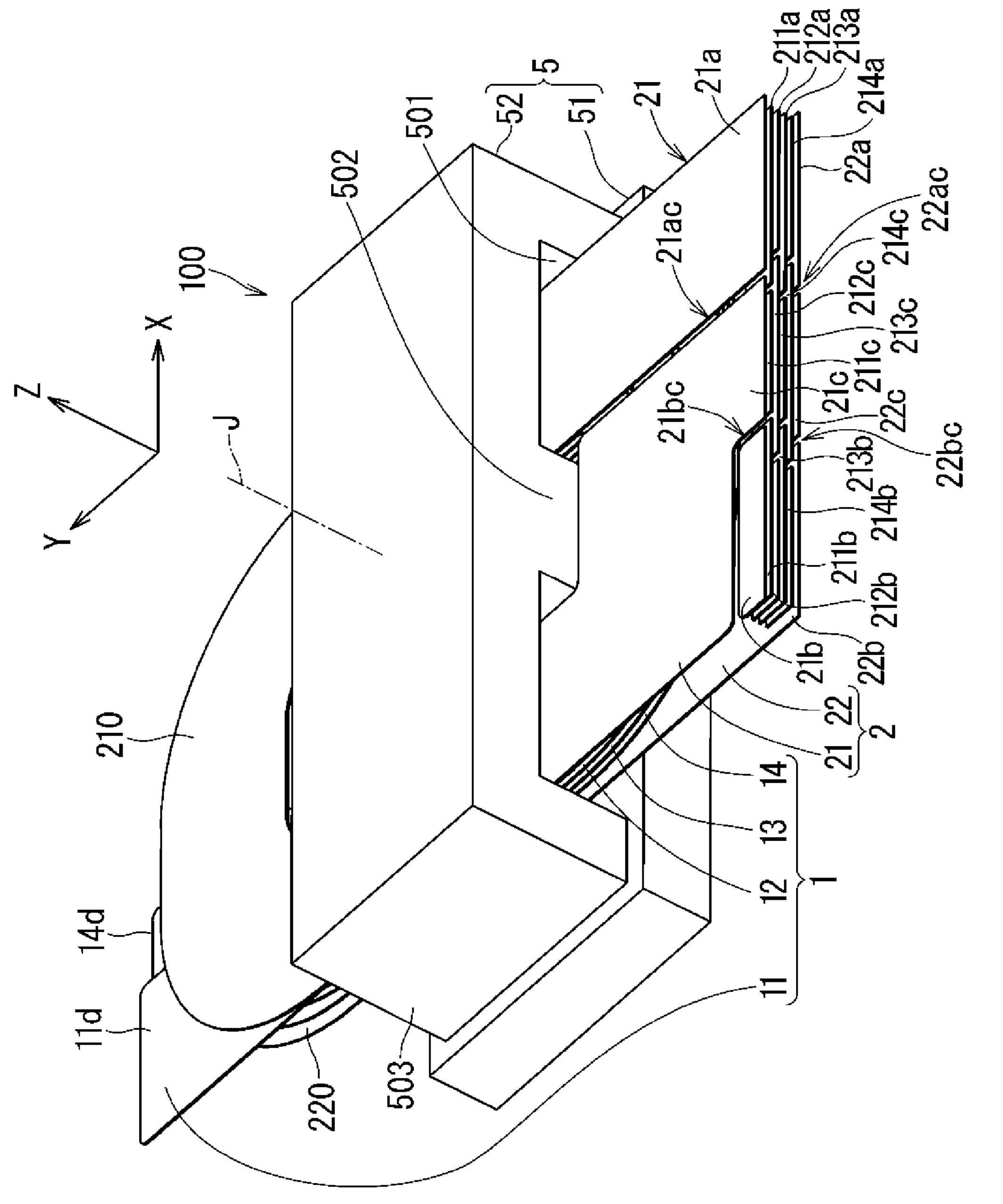
FIG. 2 is a perspective view illustratively depicting the configuration of the transformer according to Embodiment 1.

FIG. 2 is a perspective view illustratively depicting the configuration of the transformer 100. However, to facilitate viewing, FIG. 2 only depicts a portion located on the core 5 side relative to a position indicated by the line CC in FIG. 1.

Figure 3:
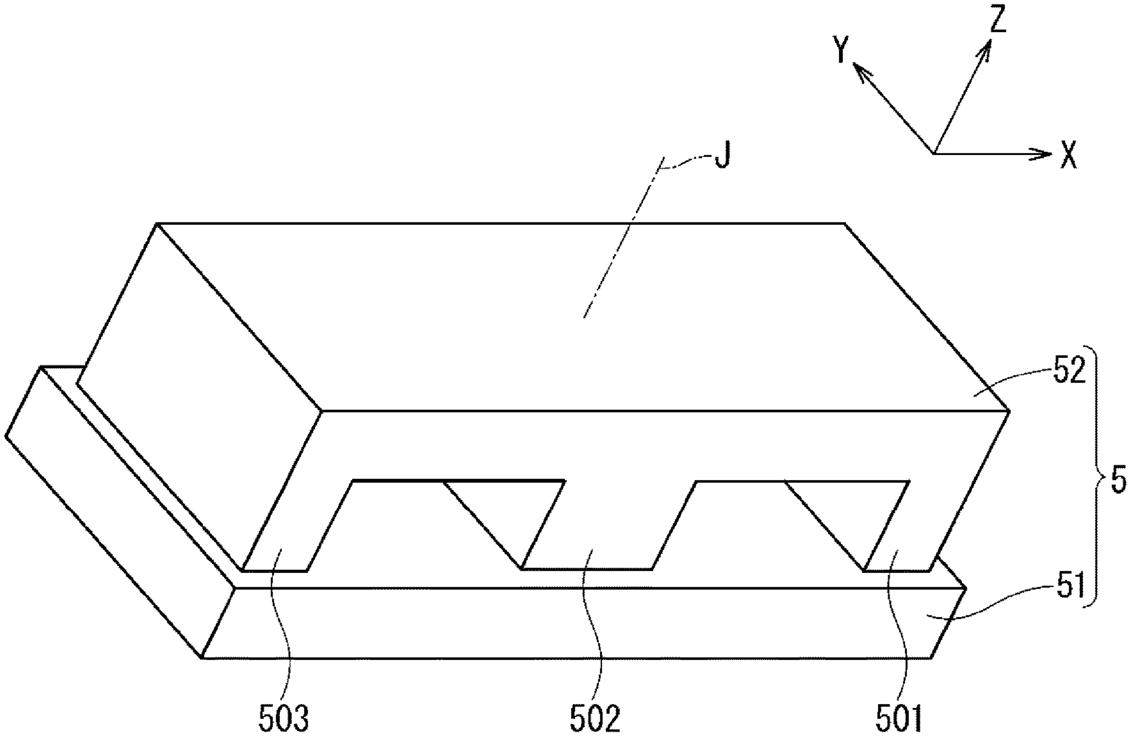
FIG. 3 is a perspective view illustratively depicting the configuration of a core.

FIG. 3 is a perspective view illustratively depicting the configuration of the core 5. The core 5 is a so-called EI core. The core 5 includes an I-core 51 and an E-core 52. The E-core 52 includes three legs 501, 502, and 503. The legs 501, 502, and 503 are arranged along a second direction X. The leg 502 is located between the legs 501 and 503. The second direction X is orthogonal to a first direction Z.

The transformer 100 includes a primary winding 1 and a secondary winding 2. The primary winding 1 includes third coils 11, 12, 13, and 14. The secondary winding 2 includes a first coil 21 and a second coil 22. The first coil 21, the second coil 22, and the third coils 11, 12, 13, and 14 are stacked in the first direction Z. The number of layers in which the third coils of the primary winding 1 are stacked is not limited to four.

All of the first coil 21, the second coil 22, and the third coils 11, 12, 13, and 14 at least partially encircle an axis J. The axis J is a virtual axis passing through the leg 502 along the first direction Z, and is indicated by the dot-dash line in all of the drawings.

The first coil 21 includes an encircling portion 210, and ends 21*a* and 21*c*. The encircling portion 210 encircles the leg 502, and hence the axis J. The ends 21*a* and 21*c* extend continuously from the encircling portion 210, and are arranged adjacent to, but not in contact with, each other in the second direction X. Hereinafter, being arranged in this manner is expressed as being "adjacent to each other in a non-contact manner". A boundary 21*ac* is a boundary between the ends 21*a* and 21*c* in the second direction X.

The second coil 22 includes an encircling portion 220, and ends 22*b* and 22*c*. The encircling portion 220 encircles the leg 502, and hence the axis J. The ends 22*b* and 21*c* extend continuously from the encircling portion 220, and are adjacent to each other in a non-contact manner in the second direction X. A boundary 22*bc* is a boundary between the ends 22*b* and 22*c* in the second direction X.

In Embodiment 1 and Embodiment 2, which will be described below, a third direction Y is introduced that is orthogonal to both the first direction Z and the second direction X. The encircling portion 210 is located on the third direction Y side relative to the ends 21*a* and 21*c*. The encircling portion 220 is located on the third direction Y side relative to the ends 22*a* and 22*c*.

The first coil 21 encircles the leg 502 once, excluding the boundary 21*ac*.

The second coil 22 encircles the leg 502 once, excluding the boundary 22*bc*. The third coils 11, 12, 13, and 14 encircle the leg 502 a plurality of times.

Figure 4:
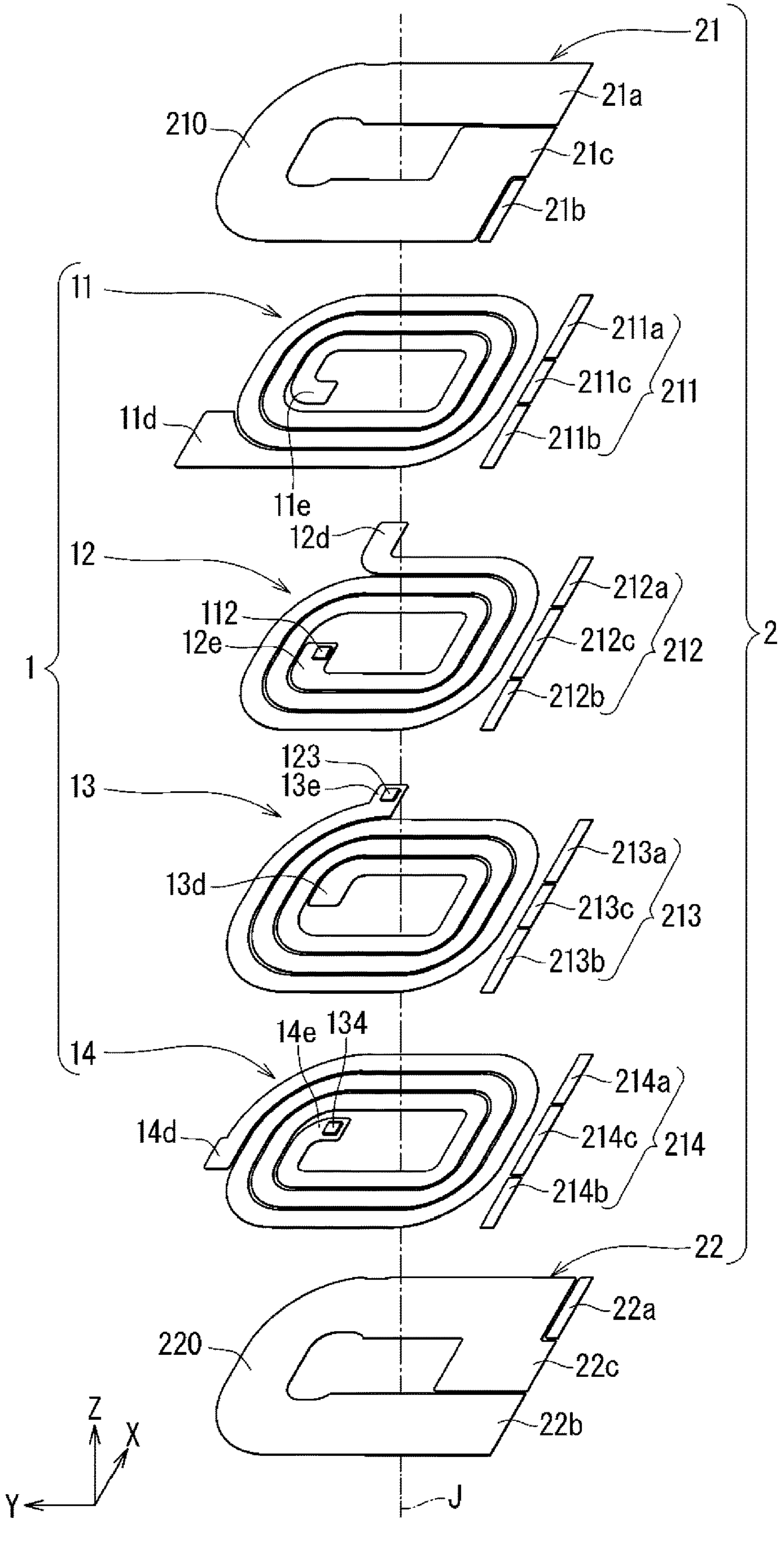
FIG. 4 is an exploded perspective view illustratively depicting a primary winding and a secondary winding.

FIG. 4 is an exploded perspective view illustratively depicting the primary winding 1 and the secondary winding 2 in the first direction Z. In FIG. 4, the core 5 is omitted. Also in FIG. 4, the region located on the core 5 side relative to the position indicated by the line CC is shown, as in the case of FIG. 2.

In the first direction Z, the second coil 22, the third coils 14, 13, 12, 11, and the first coil 21 are stacked in this order.

The third coil 11 includes ends 11*d* and 11*e*. The third coil 12 includes ends 12*d* and 12*e*. The third coil 13 includes ends 13*d* and 13*e*. The third coil 14 includes ends 14*d* and 14*e*.

In the primary winding 1, the third coils 11, 12, 13, and 14 are connected in series in this order. The end 11*e* is connected to the end 12*e* by a conductor 112. The conductor 112 is sandwiched between the ends 11*e* and 12*e* in the first direction Z so as to be conductively connected to the ends 11*e* and 12*e*. The end 12*d* is connected to the end 13*e* by a conductor 123. The conductor 123 is sandwiched between the ends 12*d* and 13*e* in the first direction Z so as to be conductively connected to the ends 12*d* and 13*e*. The end 13*d* is connected to the end 14*e* by a conductor 134. The conductor 134 is sandwiched between the ends 13*d* and 14*e* in the first direction Z so as to be conductively connected to the ends 13*d* and 14*e*. The ends 11*d* and 14*d* function as opposite ends of the primary winding 1. The ends 11*d* and 14*d* are located on the third direction Y side relative to the third coils 12 and 13.

Figure 5:
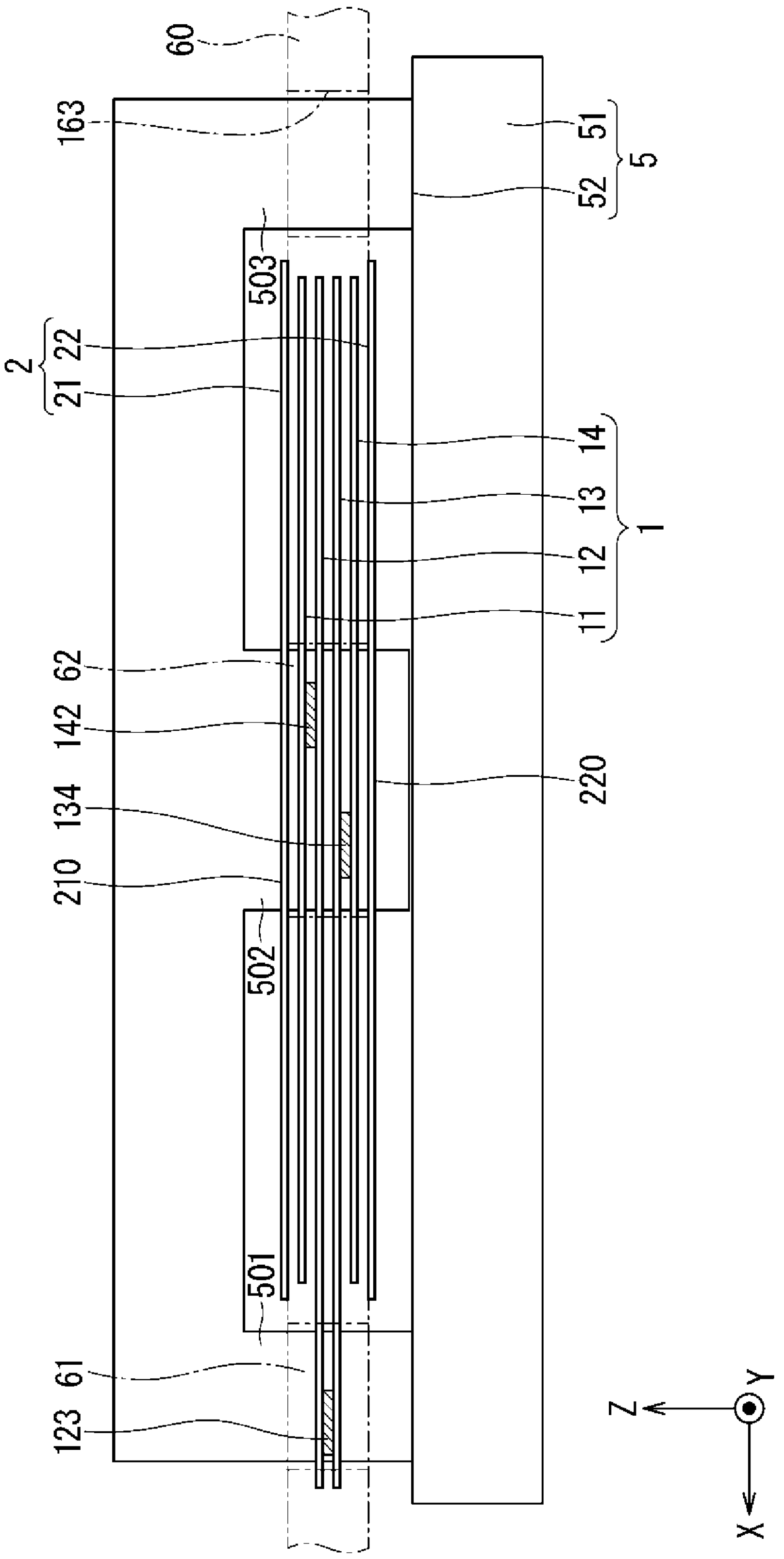
FIG. 5 is a side view illustratively depicting the configuration of the transformer according to Embodiment 1.

FIG. 5 is a side view illustratively depicting the configuration of the transformer 100. FIG. 5 shows a side as viewed from a direction opposite to the third direction Y. The hatching of the conductors 112, 123, and 134 is provided for the sake of convenience in order to improve viewability, rather than to indicate a cross section.

The first coil 21 and the second coil 22, and the third coils 11, 12, 13, and 14 can each be realized in the form of a conductive pattern in a printed circuit board 60 in which a plurality of insulating layers are stacked. The conductive pattern is provided on a boundary or a surface of a stacked insulating layer. Each of the conductors 112, 123, and 134 can be realized by a via hole that provides conductive connection in the corresponding insulating layer in the thickness direction. In FIGS. 1, 2, and 4, the insulating layers are omitted. By only depicting the contour of the printed circuit board 60 with a dot-dash line in FIG. 5, the viewability of the conductors 112, 123, and 134 is enhanced.

The secondary winding 2 includes conductor groups 211, 212, 213, and 214. The conductor group 211 includes conductors 211*a*, 211*b*, and 211*c*. The conductor group 212 includes conductors 212*a*, 212*b*, and 212*c*. The conductor group 213 includes conductors 213*a*, 213*b*, and 213*c*. The conductor group 214 includes conductors 214*a*, 214*b*, and 214*c*.

Figure 6:
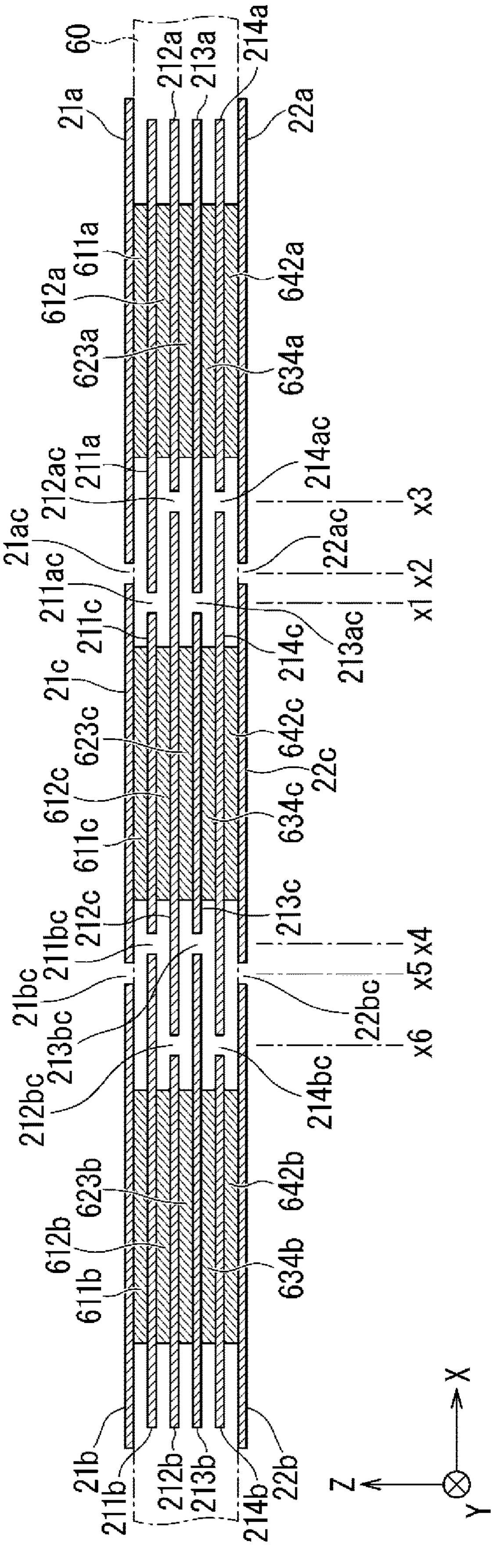
FIG. 6 is a cross-sectional view illustratively depicting the configuration of the secondary winding.

FIG. 6 is a cross-sectional view illustratively depicting the configuration of the secondary winding 2. FIG. 6 shows a cross section seen at a position indicated by the line DD shown in FIG. 1 as viewed along the third direction Y.

The end 21*a* and the end 21*c* are arranged in a non-contact manner across the boundary 21*ac* along the second direction X. The conductor 211*a* and the conductor 211*c* are arranged in a non-contact manner across a boundary 211*ac* along the second direction X. The conductor 212*a* and the conductor 212*c* are arranged in a non-contact manner across a boundary 212*ac* along the second direction X. The conductor 213*a* and the conductor 213*c* are arranged in a non-contact manner across a boundary 213*ac* along the second direction X. The conductor 214*a* and the conductor 214*c* are arranged in a non-contact manner across a boundary 214*ac* along the second direction X. The end 22*a* and the end 22*c* are arranged in a non-contact manner across a boundary 22*ac* along the second direction X.

The end 21*c* and the end 21*b* are arranged in a non-contact manner across a boundary 21*bc* along the second direction X. The conductor 211*c* and the conductor 211*b* are arranged in a non-contact manner across a boundary 211*bc* along the second direction X. The conductor 212*c* and the conductor 212*b* are arranged in a non-contact manner across a boundary 212*bc* along the second direction X. The conductor 213*c* and the conductor 213*b* are arranged in a non-contact manner across a boundary 213*bc* along the second direction X. The conductor 214*c* and the conductor 214*b* are arranged in a non-contact manner across a boundary 214*bc* along the second direction X. The end 22*c* and the end 22*b* are arranged in a non-contact manner across the boundary 22*bc* along the second direction X.

In FIGS. 2 and 4, some or all of the reference numerals of the above-described boundaries are omitted in order to avoid complication of the illustration.

A conductor 611*a* is sandwiched between the end 21*a* and the conductor 211*a* in the first direction Z so as to be conductively connected to the end 21*a* and the conductor 211*a*. The conductor 611*a* can be realized by a via hole formed in the insulating layer sandwiched between the end 21*a* and the conductor 211*a*.

A conductor 612*a* is sandwiched between the conductor 211*a* and the conductor 212*a* in the first direction Z so as to be conductively connected to the conductor 211*a* and the conductor 212*a*. The conductor 612*a* can be realized by a via hole formed in the insulating layer sandwiched between the conductor 211*a* and the conductor 212*a*.

A conductor 623*a* is sandwiched between the conductor 212*a* and the conductor 213*a* in the first direction Z so as to be conductively connected to the conductor 212*a* and the conductor 213*a*. The conductor 623*a* can be realized by a via hole formed in the insulating layer sandwiched between the conductor 212*a* and the conductor 213*a*.

A conductor 634*a* is sandwiched between the conductor 213*a* and the conductor 214*a* in the first direction Z so as to be conductively connected to the conductor 213*a* and the conductor 214*a*. The conductor 634*a* can be realized by a via hole formed in the insulating layer sandwiched between the conductor 213*a* and the conductor 214*a*.

A conductor 642*a* is sandwiched between the conductor 214*a* and the end 22*a* in the first direction Z so as to be conductively connected to the conductor 214*a* and the end 22*a*. The conductor 642*a* can be realized by a via hole formed in the insulating layer sandwiched between the conductor 214*a* and the end 22*a*.

A conductor 611*b* is sandwiched between the end 21*b* and the conductor 211*b* in the first direction Z so as to be conductively connected to the end 21*b* and the conductor 211*b*. The conductor 611*b* can be realized by a via hole formed in the insulating layer sandwiched between the end 21*b* and the conductor 211*b*.

A conductor 612*b* is sandwiched between the conductor 211*b* and the conductor 212*b* in the first direction Z so as to be conductively connected to the conductor 211*b* and the conductor 212*b*. The conductor 612*b* can be realized by a via hole formed in the insulating layer sandwiched between the conductor 211*b* and the conductor 212*b*.

A conductor 623*b* is sandwiched between the conductor 212*b* and the conductor 213*b* in the first direction Z so as to be conductively connected to the conductor 212*b* and the conductor 213*b*. The conductor 623*b* can be realized by a via hole formed in the insulating layer sandwiched between the conductor 212*b* and the conductor 213*b*.

A conductor 634*b* is sandwiched between the conductor 213*b* and the conductor 214*b* in the first direction Z so as to be conductively connected to the conductor 213*b* and the conductor 214*b*. The conductor 634*b* can be realized by a via hole formed in the insulating layer sandwiched between the conductor 213*b* and the conductor 214*b*.

A conductor 642*b* is sandwiched between the conductor 214*b* and the end 22*b* in the first direction Z so as to be conductively connected to the conductor 214*b* and the end 22*b*. The conductor 642*b* can be realized by a via hole formed in the insulating layer sandwiched between the conductor 214*b* and the end 22*b*.

A conductor 611*c* is sandwiched between the end 21*c* and the conductor 211*c* in the first direction Z so as to be conductively connected to the end 21*c* and the conductor 211*c*. The conductor 611*c* can be realized by a via hole formed in the insulating layer sandwiched between the end 21*c* and the conductor 211*c*.

A conductor 612*c* is sandwiched between the conductor 211*c* and the conductor 212*c* in the first direction Z so as to be conductively connected to the conductor 211*c* and the conductor 212*c*. The conductor 612*c* can be realized by a via hole formed in the insulating layer sandwiched between the conductor 211*c* and the conductor 212*c*.

A conductor 623*c* is sandwiched between the conductor 212*c* and the conductor 213*c* in the first direction Z so as to be conductively connected to the conductor 212*c* and the conductor 213*c*. The conductor 623*c* can be realized by a via hole formed in the insulating layer sandwiched between the conductor 212*c* and the conductor 213*c*.

A conductor 634*c* is sandwiched between the conductor 213*c* and the conductor 214*c* in the first direction Z so as to be conductively connected to the conductor 213*c* and the conductor 214*c*. The conductor 634*c* can be realized by a via hole formed in the insulating layer sandwiched between the conductor 213*c* and the conductor 214*c*.

A conductor 642*c* is sandwiched between the conductor 214*c* and the end 22*c* in the first direction Z so as to be conductively connected to the conductor 214*c* and the end 22*c*. The conductor 642*c* can be realized by a via hole formed in the insulating layer sandwiched between the conductor 214*c* and the end 22*c*.

With such conductive connection, both the end 21*a* and the end 22*a* function as one end of the secondary winding 2, both the end 21*b* and the end 22*b* function as the other end of the secondary winding 2, and both the end 21*c* and the end 22*c* function as a center tap of the secondary winding 2.

As compared with a configuration in which the primary coil and the secondary coil are provided in the same plane, such as the configuration disclosed in JP 2015-192082A, the area extending in the second direction X and the third direction Y of the transformer 100 can be reduced because the primary winding 1 and the secondary winding 2 are stacked in the first direction Z. This is advantageous in reducing the size of the transformer.

Upon applying a voltage to the ends 11*d* and 14*d* of the primary winding 1, a current flows through the primary winding 1, and a magnetic flux is generated from the current. This magnetic flux has a component constituting a so-called leakage flux, which is not interlinked with the secondary winding 2.

A first component of the leakage flux is a magnetic flux that passes between the first coil 21 and the third coil 11 in the first direction Z, and between the second coil 22 and the third coil 14 in the first direction Z, and that is not interlinked with either of the first coil 21 and the second coil 22.

A second component of the leakage flux is a magnetic flux that passes through the boundaries 21*ac*, 211*ac*, 212*ac*, 213*ac*, 214*ac*, and 22*ac* in this order, or in the reverse order.

A third component of the leakage flux is a magnetic flux that passes through the boundaries 21*bc*, 211*bc*, 212*bc*, 213*bc*, 214*bc*, and 22*bc* in this order, or in the reverse order.

The second component of the leakage flux moves back and forth in a region surrounded by a closed circuit obtained as a result of the ends 21*a* and 22*c* of the secondary winding 2 being connected to each other outside the transformer 100 via a load or directly. The third component of the leakage flux moves back and forth in a region surrounded by a closed circuit obtained as a result of the ends 21*b* and 22*c* of the secondary winding 2 being connected to each other outside the transformer 100 via a load or directly.

Accordingly, in view of reducing the second component of the leakage flux in order to reduce the leakage flux, it is desirable to increase the magnetic resistance to the second component in a path extending from the boundary 21*ac* to the boundary 22*ac* via the boundaries 211*ac*, 212*ac*, 213*ac*, and 214*ac*. In view of reducing the third component of the leakage flux in order to reduce the leakage flux, it is also desirable to increase the magnetic resistance to the third component in a path extending from the boundary 21*bc* to the boundary 22*bc* via the boundaries 211*bc*, 212*bc*, 213*bc*, and 214*bc*.

In the second direction X, the boundaries 21*ac*, 211*ac*, 212*ac*, 213*ac*, 214*ac*, and 22*ac* are at positions x2, x1, x3, x1, x3, and x2, respectively. Also, the positions x1, x2, and x3 are all different from one another. Accordingly, the second component of the leakage flux generally flows in the first direction Z or a direction opposite thereto, but flows in a serpentine manner along the second direction X. Such a serpentine magnetic path increases the magnetic resistance to the second component of the leakage flux.

In the second direction X, the boundaries 21*bc*, 211*bc*, 212*bc*, 213*bc*, 214*bc*, and 22*bc* are at positions x5, x4, x6, x4, x6, and x5, respectively. Also, the positions x4, x5, and x6 are all different from one another. Accordingly, the third component of the leakage flux generally flows in the first direction Z or a direction opposite thereto, but flows in a serpentine manner along the second direction X. Such a serpentine magnetic path increases the magnetic resistance to the third component of the leakage flux.

The example shown in FIG. 6 illustrates a case where the positions in the second direction X of the boundaries adjacent to each other in the first direction Z are necessarily different from each other. In this case, as compared with a case where the positions in the second direction X of the boundaries adjacent to each other in the first direction Z are all the same, the leakage flux is reduced by about 20 to 30 percent (provided that the ends 21*a* and 21*c* are shorted, and the end 21*b* is open).

The positional relationship between the conductors illustrated in FIG. 6 is desirable in view of increasing the magnetic resistance; however, such a positional relationship is not necessarily required.

When any two of the positions in the second direction X of the boundaries 21*ac*, 211*ac*, 212*ac*, 213*ac*, 214*ac*, and 22*ac* are different from each other, the magnetic path is longer than that in the case where any two of the positions are not different from each other (i.e., none of the positions are different from one another), resulting in an increase in the magnetic resistance to the second component of the leakage flux. For example, the boundaries 212*ac* and 214*ac* may be at the position x1. Although the boundaries 21*ac* and 22*ac* are both located at the position x2 in FIG. 6, the boundaries 21*ac* and 22*ac* may be at positions different from each other in the second direction X.

When any two of the positions in the second direction X of the boundaries 21*bc*, 211*bc*, 212*bc*, 213*bc*, 214*bc*, and 22*bc* are different from each other, the magnetic path is longer than that in the case where any two of the positions are not different from each other (i.e., none of the positions are different from one another), resulting in an increase in the magnetic resistance to the third component of the leakage flux. For example, the boundaries 212*bc* and 214*bc* may be at the position x4. Although the boundaries 21*bc* and 22*bc* are both located at the position x5 in FIG. 6, the boundaries 21*bc* and 22*bc* may be at positions different from each other in the second direction X.

The foregoing can be expressed as follows. First, in a configuration in view of reducing the second component of the leakage flux:

(ia) the first position is different from at least one of the second position and the third position;

(iia) the first position is any one of:

the position x1 in the second direction X of the boundary 211*ac* between the conductor 211*a* and the conductor 211*c*;

the position x3 in the second direction X of the boundary 212*ac* between the conductor 212*a* and the conductor 212*c;* the position x1 in the second direction X of the boundary 213*ac* between the conductor 213*a* and the conductor 213*c;* and the position x3 in the second direction X of the boundary 214*ac* between the conductor 214*a* and the conductor 214*c;*

(iiia) the second position is the position x2 in the second direction X of the boundary 21*ac* between the end 21*a* and the end 21*c;* and (iva) the third position is the position x2 in the second direction X of the boundary 22*ac* between the end 22*a* and the end 22*c*.

Also in a configuration in view of reducing the third component of the leakage flux, as in the case of (ia) to (iva) above:

(ib) the first position is different from at least one of the second position and the third position;

(iib) the first position is any one of:

the position x4 in the second direction X of the boundary 211*bc* between the conductor 211*b* and the conductor 211*c;* the position x6 in the second direction X of the boundary 212*bc* between the conductor 212*b* and the conductor 212*c;* the position x4 in the second direction X of the boundary 213*bc* between the conductor 213*b* and the conductor 213*c;* and the position x6 in the second direction X of the boundary 214*bc* between the conductor 214*b* and the conductor 214*c;*

(iiib) the second position is the position x5 in the second direction X of the boundary 21*bc* between the end 21*b* and the end 21*c;* and (ivb) the third position is the position x5 in the second direction X of the boundary 22*bc* between the end 22*b* and the end 22*c*.

Example of Application to Full-Bridge DC/DC Converter

Figure 7:
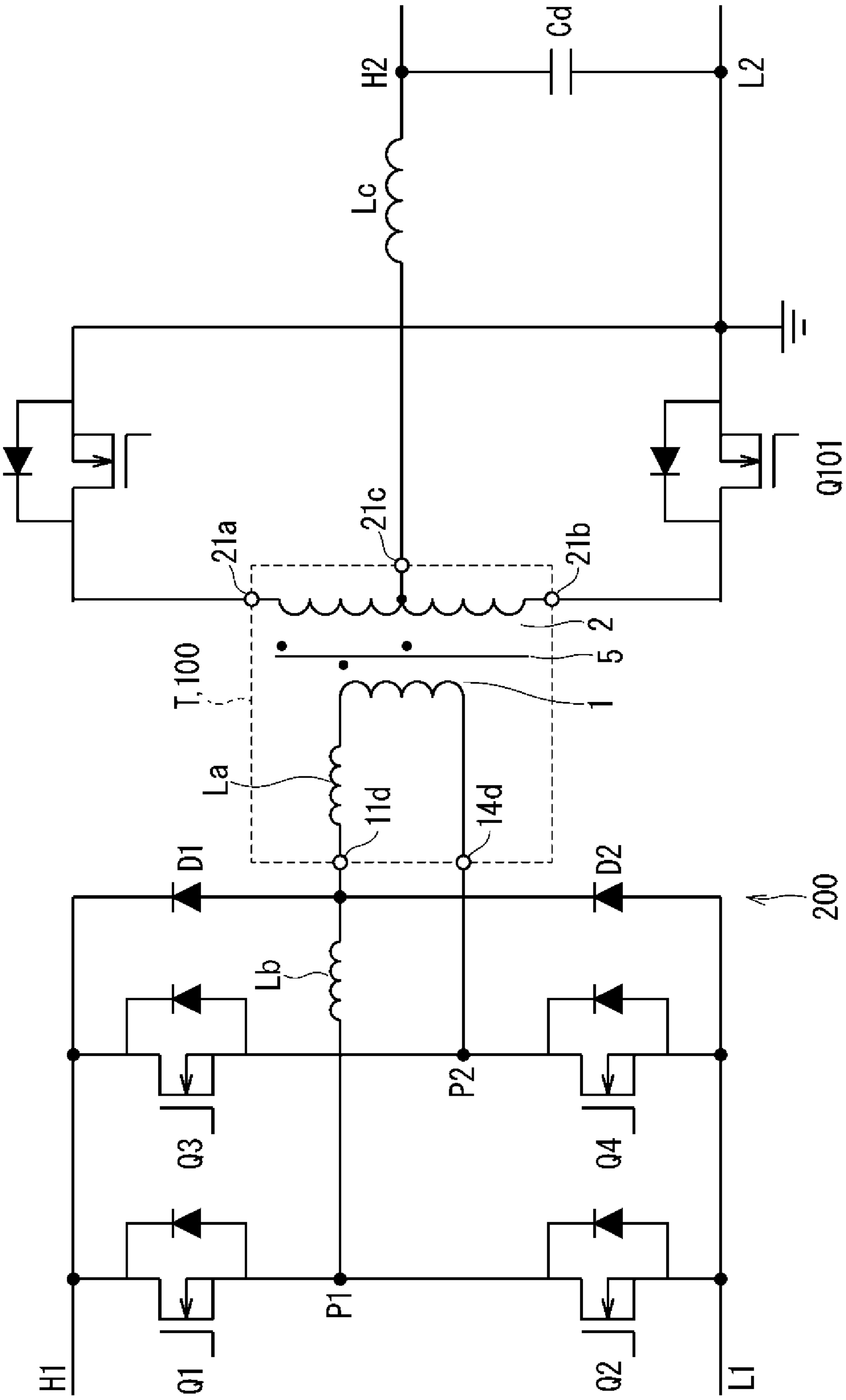
FIG. 7 is a circuit diagram illustratively depicting a converter in which the transformer according to Embodiment 1 is used.

FIG. 7 is a circuit diagram illustratively depicting a converter 200 in which the transformer 100 is used. The converter 200 is a full-bridge DC/DC converter. The transformer 100 is used as a transformer T in the converter 200.

The ends 11*d* and 14*d* of the transformer 100 function as primary-side terminals of the transformer T. The ends 21*a,* 21*b,* and 21*c* of the transformer 100 function as secondary-side terminals of the transformer T. The end 21*c* functions as a center tap of the transformer T. An inductor La having one end connected to the end 11*d* inside the transformer T equivalently indicates the leakage inductance of the transformer T on the primary side.

On the primary side of the transformer T, switching elements Q1, Q2, Q3, and Q4 and diodes D1 and D2 are provided between power lines H1 and L1. The power line H1 has a higher potential than the power line L1.

The switching elements Q1 and Q2 are connected in series between the power lines H1 and L1. The switching elements Q3 and Q4 are connected in series between the power lines H1 and L1.

The diodes D1 and D2 are connected in series between the power lines H1 and L1. The anode of the diode D1 and the cathode of the diode D2 are connected to the end 11*d*. The cathode of the diode D1 is connected to the power line H1. The anode of the diode D2 is connected to the power line L1.

The end 11*d* is connected, via an inductor Lb, to a connection point P1 at which the switching elements Q1 and Q2 are connected to each other. The end 14*d* is connected to a connection point P2 at which the switching elements Q3 and Q4 are connected to each other.

Switching elements Q101 and Q102, an inductor Lc, and a capacitor Cd are provided on the secondary side of the transformer T. The capacitor Cd is provided between power lines H2 and L2. The power line H2 has a higher potential than the power line L2. The power line L2 is grounded, for example.

One end of the switching element Q101 is connected to the end 21*b,* and the other end thereof is connected to the power line L2. One end of the switching element Q102 is connected to the end 21*a,* and the other end thereof is connected to the power line L2. One end of the inductor Lc is connected to the end 21*c,* and the other end thereof is connected to the power line H2.

All of the switching elements Q1, Q2, Q3, Q4, Q101, and Q102 are realized by a field-effect transistor, for example.

Since the operations of the converter 200 having the above-described configuration, including, for example, the timing at which the switching elements Q1, Q2, Q3, Q4, Q101, and Q102 are switched, are known, descriptions of the operations are omitted in the present embodiment. A description will be given of an advantage of using the transformer 100 in the transformer T to reduce the leakage inductance of the primary side.

The inductor Lb has the function of reducing the surge voltage on the secondary side of the converter 200. Energy is regenerated to the power lines H1 and L1 via the diodes D1 and D2.

The larger the ratio of the inductance of the inductor Lb to the inductance (the leakage inductance on the primary side of the transformer T) of the inductor La, the greater the effect of reducing the surge voltage on the secondary side is. Since the sum of the inductance of the inductor Lb and the inductance of the inductor La affects the resonant period of so-called soft switching, it is not desirable to increase the inductance of the inductor Lb without limitation. Therefore, it is desirable that the inductance of the inductor La is small.

The transformer 100 has the above-described features (i) to (iv), and the leakage inductance on the primary side thereof is reduced. Accordingly, the transformer 100 is suitably applied to a full-bridge DC/DC converter, such as the converter 200 in which the inductor Lb is used.

Embodiment 2

A transformer according to Embodiment 2 will be described. Note that the same constituent elements as those described in Embodiment 1 are denoted by the same reference numerals in the description of Embodiment 2, and the description thereof has been omitted.

Figure 8:
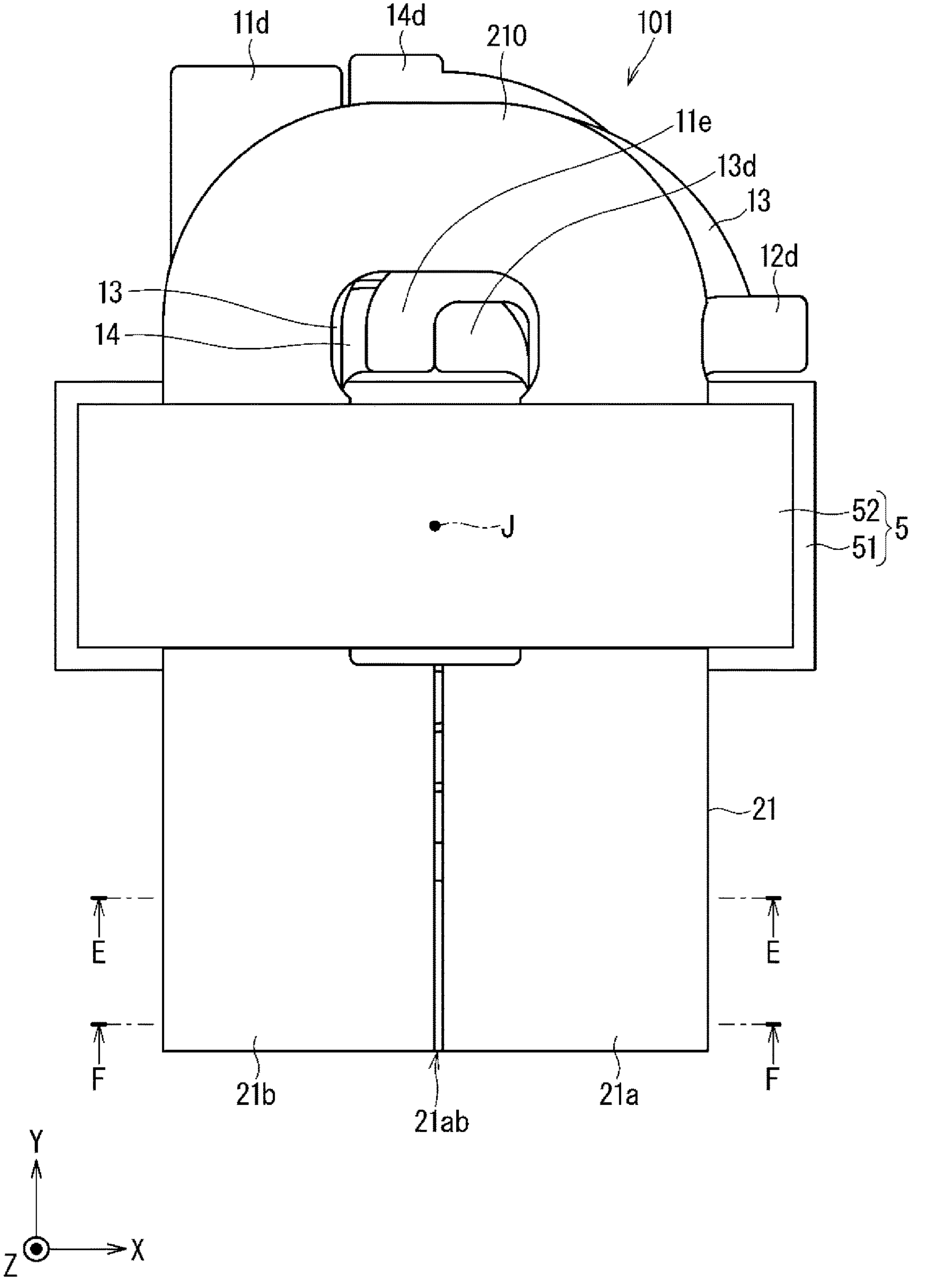
FIG. 8 is a plan view illustratively depicting the configuration of a transformer according to Embodiment 2.

FIG. 8 is a plan view illustratively depicting the configuration of a transformer 101 according to Embodiment 2. The transformer 101 includes a core 5. The same configuration as that of the core 5 of the transformer 100 can be used for the core 5.

Figure 9:
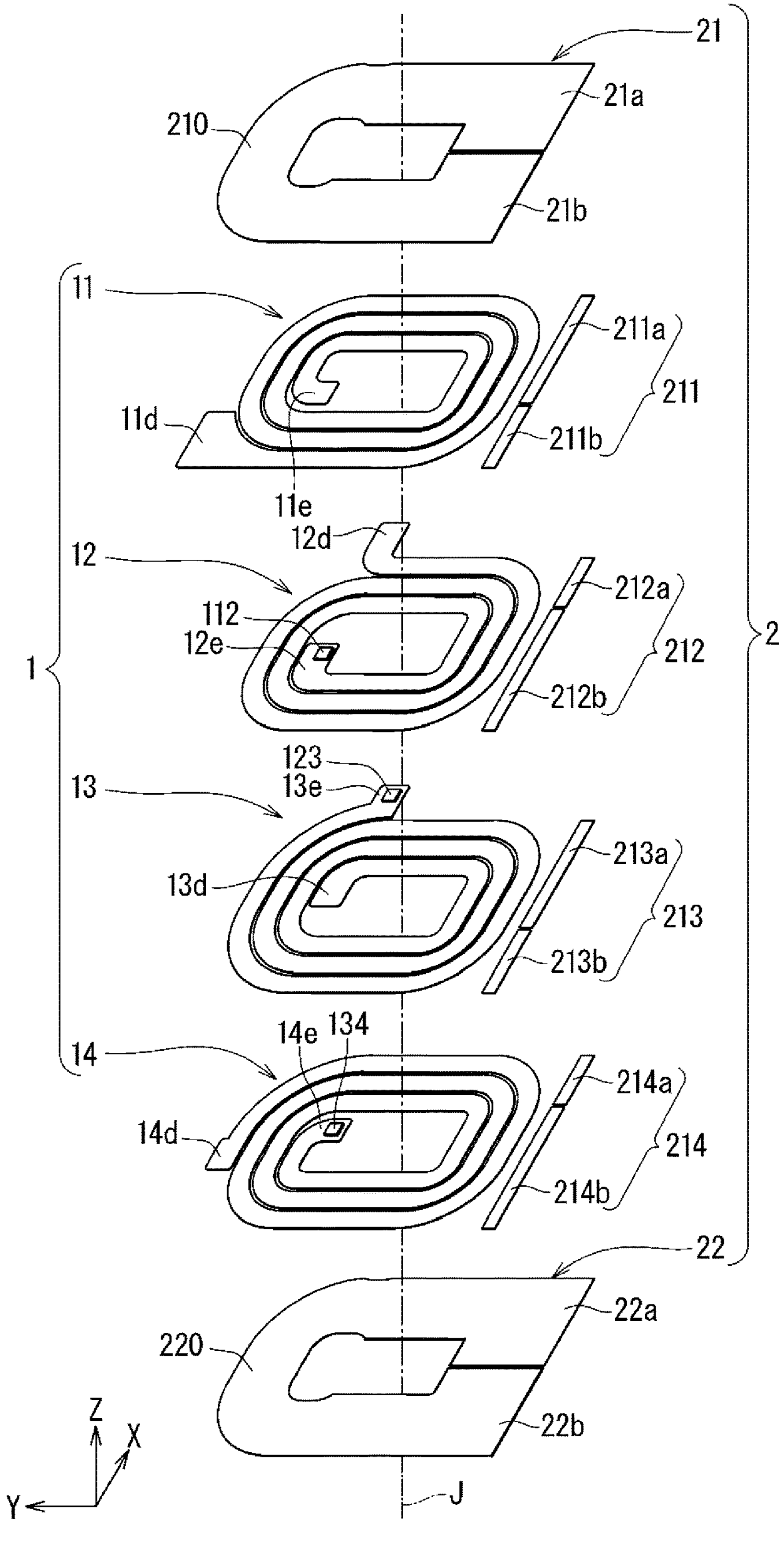
FIG. 9 is an exploded perspective view illustratively depicting a primary winding and a secondary winding.

FIG. 9 is an exploded perspective view illustratively depicting a primary winding 1 and a secondary winding 2 in a first direction Z. The core 5 is omitted in FIG. 9. FIG. 9 shows a region located on the core 5 side relative to a position indicated by the line EE in FIG. 8.

The transformer 101 includes a primary winding 1 and a secondary winding 2. The primary winding 1 includes third coils 11, 12, 13, and 14. The secondary winding 2 includes a first coil 21 and a second coil 22. In the first direction Z, the second coil 22, the third coils 14, 13, 12, and 11, and the first coil 21 are stacked in this order.

All of the first coil 21, the second coil 22, and the third coils 11, 12, 13, and 14 at least partially encircle an axis J. As an example of the configuration of the third coils 11, 12, 13, and 14 of the transformer 101, the configuration of the third coils 11, 12, 13, and 14 illustrated in the transformer 100 is used. The number of layers in which the coils of the primary winding 1 are stacked is not limited to four.

The first coil 21 includes an encircling portion 210, and ends 21*a* and 21*b*. The encircling portion 210 encircles the axis J. As the encircling portion 210 of the transformer 101, the encircling portion 210 of the transformer 100 is used, for example. The ends 21*a* and 21*b* extend continuously from the encircling portion 210, and are adjacent to each other in a non-contact manner in the second direction X. A boundary 21*ab* is a boundary between the ends 21*a* and 21*b* in the second direction X.

The second coil 22 includes an encircling portion 220, and ends 22*a* and 22*b*. The encircling portion 220 encircles the axis J. As the encircling portion 220 of the transformer 101, the encircling portion 220 of the transformer 100 is used, for example. The ends 22*a* and 22*b* extend continuously from the encircling portion 210, and are adjacent to each other in a non-contact manner in the second direction X. A boundary 22*ab* is a boundary between the ends 22*a* and 22*b* in the second direction X.

The encircling portion 210 is located on the third direction Y side relative to the ends 21*a* and 21*b*. The encircling portion 220 is located on the third direction Y side relative to the ends 22*a* and 22*b*.

The first coil 21 encircles the axis J once, excluding the boundary 21*ab*. The second coil 22 encircles the axis J once, excluding the boundary 22*ab*.

The first coil 21, the second coil 22, and the third coils 11, 12, 13, and 14 can each be realized in the form of a conductive pattern in a printed circuit board 60 in which a plurality of insulating layers are stacked. The conductive pattern is provided on a boundary or surface of a stacked insulating layer. Each of the conductors 112, 123, and 134 can be realized by a via hole that provides conductive connection in the corresponding insulating layer in the thickness direction. The insulating layers are omitted in FIGS. 8 and 9.

The secondary winding 2 includes conductor groups 211, 212, 213, and 214. The conductor group 211 includes conductors 211*a* and 211*b*. The conductor group 212 includes conductors 212*a* and 212*b*. The conductor group 213 includes conductors 213*a* and 213*b*. The conductor group 214 includes conductors 214*a* and 214*b*.

Figure 10:
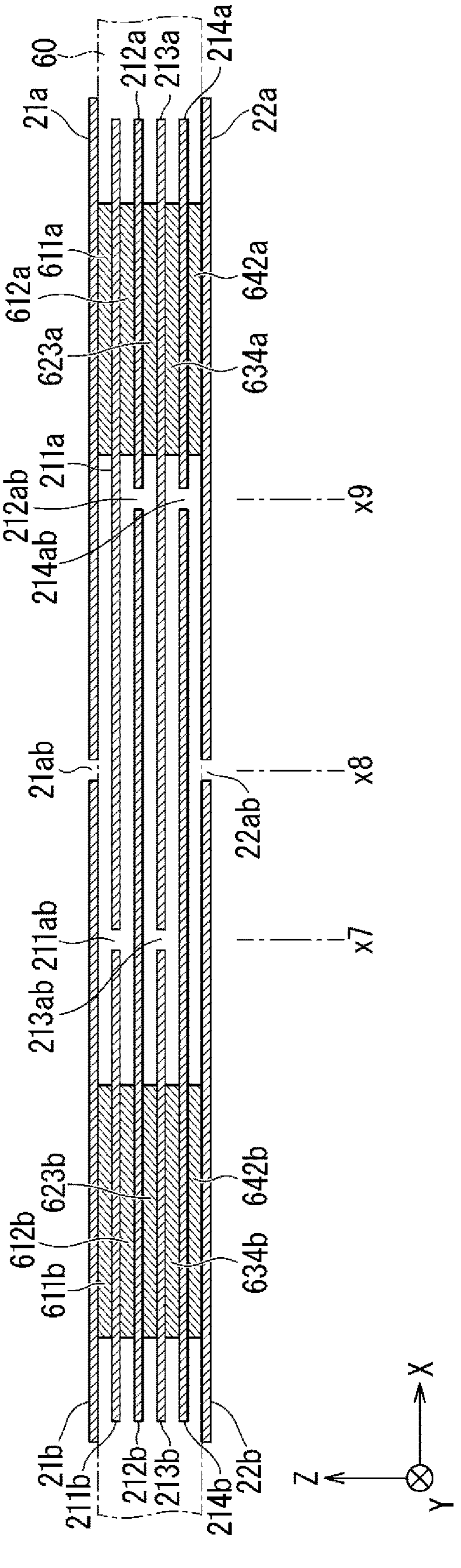
FIG. 10 is a cross-sectional view illustratively depicting the configuration of the secondary winding.

FIG. 10 is a cross-sectional view illustratively depicting the configuration of the secondary winding 2. FIG. 10 shows a cross section seen at a position indicated by the line FF shown in FIG. 8 as viewed along the third direction Y.

The end 21*a* and the end 21*b* are arranged in a non-contact manner across the boundary 21*ab* along the second direction X. The conductor 211*a* and the conductor 211*b* are arranged in a non-contact manner across a boundary 211*ab* along the second direction X. The conductor 212*a* and the conductor 212*b* are arranged in a non-contact manner across a boundary 212*ab* along the second direction X. The conductor 213*a* and the conductor 213*b* are arranged in a non-contact manner across a boundary 213*ab* along the second direction X. The conductor 214*a* and the conductor 214*b* are arranged in a non-contact manner across a boundary 214*ab* along the second direction X. The end 22*a* and the end 22*b* are arranged in a non-contact manner across the boundary 22*ab* along the second direction X.

In FIGS. 8 and 9, some or all of the reference numerals of the above-described boundaries are omitted in order to avoid complication of the illustration.

The conductors 611*a*, 612*a*, 623*a*, 634*a*, 642*a*, 611*b*, 612*b*, 623*b*, 634*b*, and 642*b* are configured and arranged in the same manner as the transformer 100. The transformer 101 does not include the ends 21*c* and 22*c* included in the transformer 100. Accordingly, the conductors 611*c*, 612*c*, 623*c*, 634*c*, and 642*c* are not provided in the transformer 101.

With such conductive connection, both the end 21*a* and the end 22*a* function as one end of the secondary winding 2, and both the end 21*b* and the end 22*b* function as the other end of the secondary winding 2.

Also in the transformer 101, the magnetic flux generated upon application of a voltage to the ends 11*d* and 14*d* of the primary winding 1 includes a component constituting a leakage flux.

A first component of the leakage flux is a magnetic flux that passes between the first coil 21 and the third coil 11 in the first direction Z, and between the second coil 22 and the third coil 14 in the first direction Z, and that is not interlinked with either of the first coil 21 and the second coil 22.

A second component of the leakage flux is a magnetic flux that passes through the boundaries 21*ab*, 211*ab*, 212*ab*, 213*ab*, 214*ab*, and 22*ab* in this order, or in the reverse order.

Accordingly, in view of reducing the second component of the leakage flux in order to reduce the leakage flux, it is desirable to increase the magnetic resistance in a path extending from the boundary 21*ab* to the boundary 22*ab* via the boundaries 211*ab*, 212*ab*, 213*ab*, and 214*ab*.

In the second direction X, the boundaries 21*ab*, 211*ab*, 212*ab*, 213*ab*, 214*ab*, and 22*ab* are at positions x8, x7, x9, x7, x9, and x8, respectively. Also, the positions x7, x8, and x9 are all different from one another. Accordingly, the second component of the leakage flux generally flows in the first direction Z or a direction opposite thereto, but flows in a serpentine manner along the second direction X. Such a serpentine magnetic path increases the magnetic resistance to the second component of the leakage flux.

The example shown in FIG. 10 illustrates a case where the positions in the second direction X of the boundaries adjacent to each other in the first direction Z are necessarily different from each other. The positional relationship between the conductors illustrated in FIG. 10 is desirable in view of increasing the magnetic resistance; however, such a positional relationship is not necessarily required.

When any two of the positions in the second direction X of the boundaries 21*ab*, 211*ab*, 212*ab*, 213*ab*, 214*ab*, and 22*ab* are different from each other, the magnetic path is longer than that in the case where any two positions are not different from each other (i.e., none of the positions are different from one another), resulting in an increase in the magnetic resistance to the second component of the leakage flux. For example, the boundaries 212*ab* and 214*ab* may be at the position x7. Although the boundaries 21*ab* and 22*ab* are both located at the position x8 in FIG. 10, the boundaries 21*ab* and 22*ab* may be at positions different from each other in the second direction X.

The foregoing can be generally expressed as follows.

(i) the first position is different from at least one of the second position and the third position;

(ii) the first position is any one of:

the position x7 in the second direction X of the boundary 211*ab* between the conductor 211*a* and the conductor 211*b;* the position x9 in the second direction X of the boundary 212*ab* between the conductor 212*a* and the conductor 212*b;* the position x7 in the second direction X of the boundary 213*ab* between the conductor 213*a* and the conductor 213*b;* and the position x9 in the second direction X of the boundary 214*ab* between the conductor 214*a* and the conductor 214*b;*

(iii) the second position is the position x8 in the second direction X of the boundary 21*ab* between the end 21*a* and the end 21*b;* and (iv) the third position is the position x8 in the second direction X of the boundary 22*ab* between the end 22*a* and the end 22*b.*

APPENDIX

Not all of the third coils 11, 12, 13, and 14 necessarily need to be sandwiched between the first coil 21 and the second coil 22 in the first direction Z. Any of the third coils 11, 12, 13, and 14 may be sandwiched between the first coil 21 and the second coil 22, or none of them need to be sandwiched between the first coil 21 and the second coil 22.

In view of reducing the first component of the leakage flux, in a preferred example of the arrangement, all of the third coils 11, 12, 13, and 14 are sandwiched between the first coil 21 and the second coil 22 in the first direction Z.

When the primary winding 1 and the secondary winding 2 are realized in the printed circuit board 60, it is desirable that the first coil 21 is not sandwiched between any of the second coil 22 and the third coils 11, 12, 13, and 14. The reason being that the ends 21*a*, 21*b*, and 21*c* are likely to be connected to an external device of the transformer 100. Alternatively, it is desirable that the second coil 22 is not sandwiched between any of the first coil 21 and thew third coils 11, 12, 13, and 14. The reason being that the ends 22*a*, 22*b*, and 22*c* are likely to be connected to an external device of the transformer 100.

It should be appreciated that the configurations described in the embodiments and modifications above may be combined as appropriate as long as there are no mutual inconsistencies.

The invention claimed is:

1. A transformer comprising:

a primary winding and a secondary winding that are insulated from each other, the secondary winding including a first coil and a second coil that are conductively connected to each other, the first coil and the second coil being planar sheets of conductive material, the primary winding including a third coil, the third coil being planar sheets of conductive material, and all of the first coil, the second coil, and the third coil at least partially encircling one axis extending along a first direction, wherein the first coil, the second coil, and the third coil are stacked in the first direction, the first coil includes a first end and a second end, the second coil includes a third end and a fourth end, the secondary winding further includes a first conductor and a second conductor, the first conductor and the second conductor being planar sheets of conductive material, the first conductor is sandwiched between the first end and the third end in the first direction so as to be conductively connected to the first end and the third end, the second conductor is sandwiched between the second end and the fourth end in the first direction so as to be conductively connected to the second end and the fourth end, a second direction is orthogonal to the first direction, the first end and the second end are arranged adjacent to, but not in contact with, each other in the second direction, the third end and the fourth end are arranged adjacent to, but not in contact with, each other in the second direction, the first conductor and the second conductor are arranged adjacent to, but not in contact with, each other in the second direction, a first position is different from at least one of a second position and a third position, the first position is a position in the second direction of a boundary between the first conductor and the second conductor, the second position is a position in the second direction of a boundary between the first end and the second end, and the third position is a position in the second direction of a boundary between the third end and the fourth end.

2. The transformer according to claim 1, wherein the secondary winding further includes a third conductor, the first coil further includes a fifth end, the second coil further includes a sixth end, the fifth end and the second end are arranged adjacent to, but not in contact with, each other in the second direction, the sixth end and the fourth end are arranged adjacent to, but not in contact with, each other in the second direction, the third conductor is sandwiched between the fifth end and the sixth end in the first direction so as to be conductively connected to the fifth end and the sixth end, the third conductor and the second conductor are arranged adjacent to, but not in contact with, each other in the second direction, a fourth position is different from at least one of the first position and the second position, and the fourth position is a position in the second direction of a boundary between the third conductor and the second conductor.

3. The transformer according to claim 1, wherein the third coil is sandwiched between the first coil and the second coil in the first direction, and the third coil, the first conductor, and the second conductor are located aligned in the first direction.

4. The transformer according to claim 2, wherein the third coil is sandwiched between the first coil and the second coil in the first direction, and the third coil, the first conductor, and the second conductor are located aligned in the first direction.

* * * * *